(12) United States Patent
Condevaux et al.

(10) Patent No.: US 6,925,812 B2
(45) Date of Patent: Aug. 9, 2005

(54) ROTARY INJECTOR

(75) Inventors: Jamey J. Condevaux, Royal Oak, MI (US); Guido J. Defever, Commerce Township, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 0 days.

(21) Appl. No.: 10/249,967

(22) Filed: May 22, 2003

(65) Prior Publication Data

US 2005/0039463 A1 Feb. 24, 2005

(51) Int. Cl.$^7$ ............................................. F02C 7/22
(52) U.S. Cl. ...................... 60/776; 60/745; 431/168; 239/214.11; 239/214.15
(58) Field of Search ...................... 60/744, 745, 776; 431/168; 239/214, 214.11, 214.15

(56) References Cited

U.S. PATENT DOCUMENTS

| | | | | |
|---|---|---|---|---|
| 903,657 A | 11/1908 | Beckmann | ................ | 60/39.39 |
| 1,736,799 A * | 11/1929 | Planert | ...................... | 239/214 |
| 1,940,758 A * | 12/1933 | Lehrecke | ................... | 423/317 |
| 2,177,245 A | 10/1939 | Dennis | ....................... | 431/185 |
| 2,479,777 A | 8/1949 | Price | ........................... | 60/261 |
| 2,508,420 A | 5/1950 | Redding | ...................... | 60/746 |
| 2,518,881 A | 8/1950 | Goddard | ...................... | 60/258 |
| 2,705,401 A | 4/1955 | Allen et al. | .................. | 60/743 |
| 2,720,750 A | 10/1955 | Schelp | ........................ | 60/269 |
| 2,766,071 A * | 10/1956 | Flury | ........................... | 96/284 |
| 2,775,864 A | 1/1957 | Karcher | ...................... | 60/261 |
| 2,866,313 A | 12/1958 | Holl | ............................. | 60/261 |
| 2,914,912 A | 12/1959 | Woll | ............................ | 60/261 |
| 2,981,066 A | 4/1961 | Johnson | ....................... | 60/278 |
| 3,286,473 A | 11/1966 | Cowell | ........................ | 60/258 |
| 3,307,359 A | 3/1967 | Cowell | ........................ | 60/258 |
| 3,321,912 A * | 5/1967 | Oprecht | ....................... | 60/804 |
| 3,828,574 A | 8/1974 | Boy-Marcotte | .............. | 60/467 |
| 4,769,996 A | 9/1988 | Barbeau | ...................... | 60/745 |
| 4,870,825 A | 10/1989 | Chapman | .................... | 60/745 |
| 5,224,713 A | 7/1993 | Pope | ........................... | 277/415 |
| 5,323,602 A | 6/1994 | Defever | ..................... | 60/39.36 |
| 5,713,327 A | 2/1998 | Tilton et al. | ................ | 123/299 |
| 6,205,770 B1 | 3/2001 | Williams et al. | ............. | 60/204 |
| 6,220,016 B1 | 4/2001 | Defever et al. | .............. | 60/267 |
| 6,269,647 B1 | 8/2001 | Thompson et al. | ........... | 60/748 |

* cited by examiner

*Primary Examiner*—Ehud Gartenberg
(74) *Attorney, Agent, or Firm*—Dinnin & Dunn, P.C.

(57) ABSTRACT

A radially-extending arm is adapted to rotate within a stream of first fluid flowing thereacross. In one embodiment, the arm comprises a plurality of lands located at different radial distances from the axis of rotation, and a port located on each land is operatively coupled to a source of a second fluid. The second fluid is sprayed from the rotating arm into the stream of first fluid that flows across the lands, and is thereby atomized. In another embodiment, the arm comprises a land stepped into the trailing edge thereof, and a port for injecting the second fluid is located on the land. In another embodiment, the land comprises a groove located between the port and an associated riser surface stepped into the trailing edge. In another embodiment, the arm comprises a port in the trailing edge thereof from which the second fluid is injected, and a groove is located on the trailing edge in a radially increasing direction from the port.

35 Claims, 9 Drawing Sheets

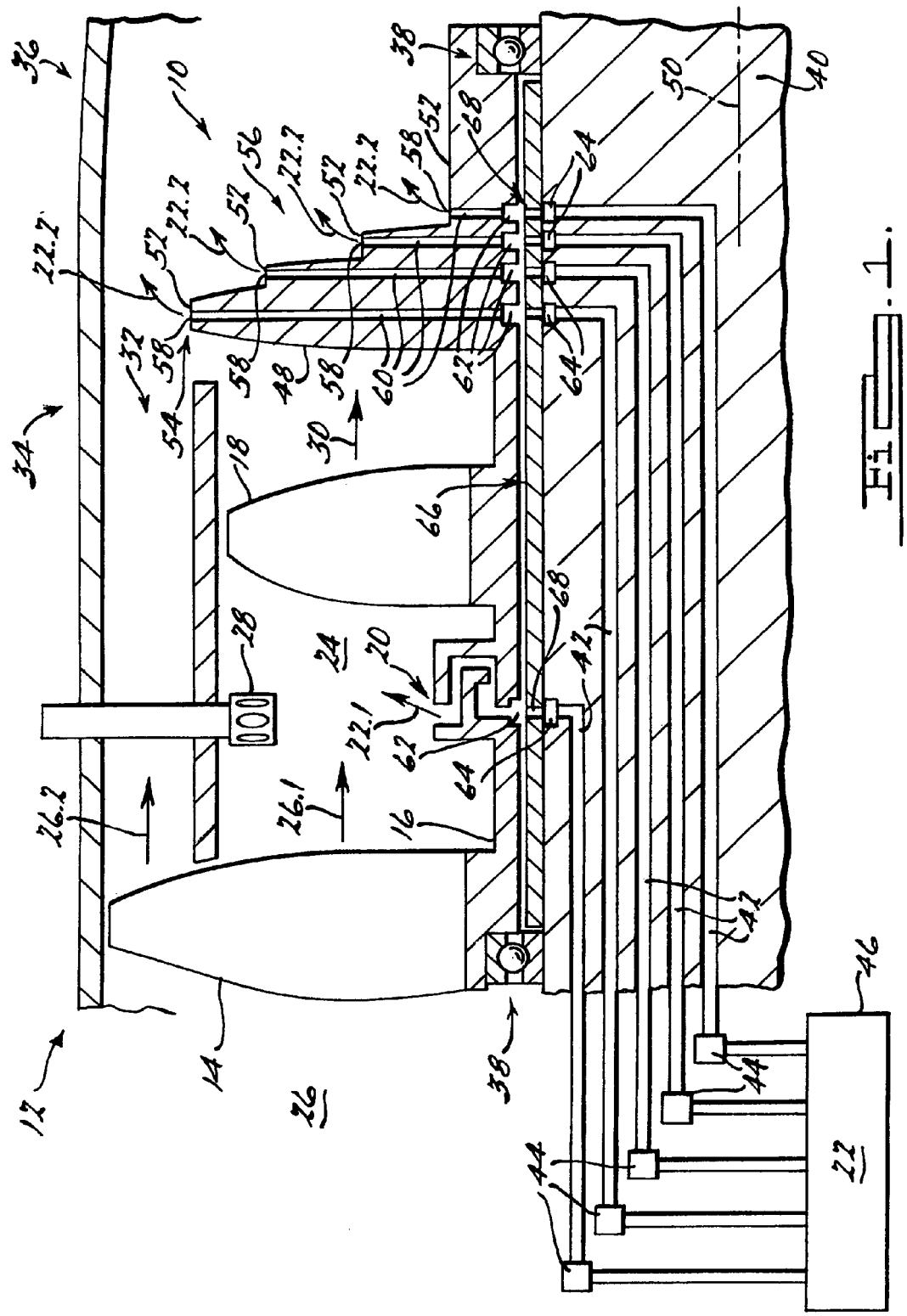

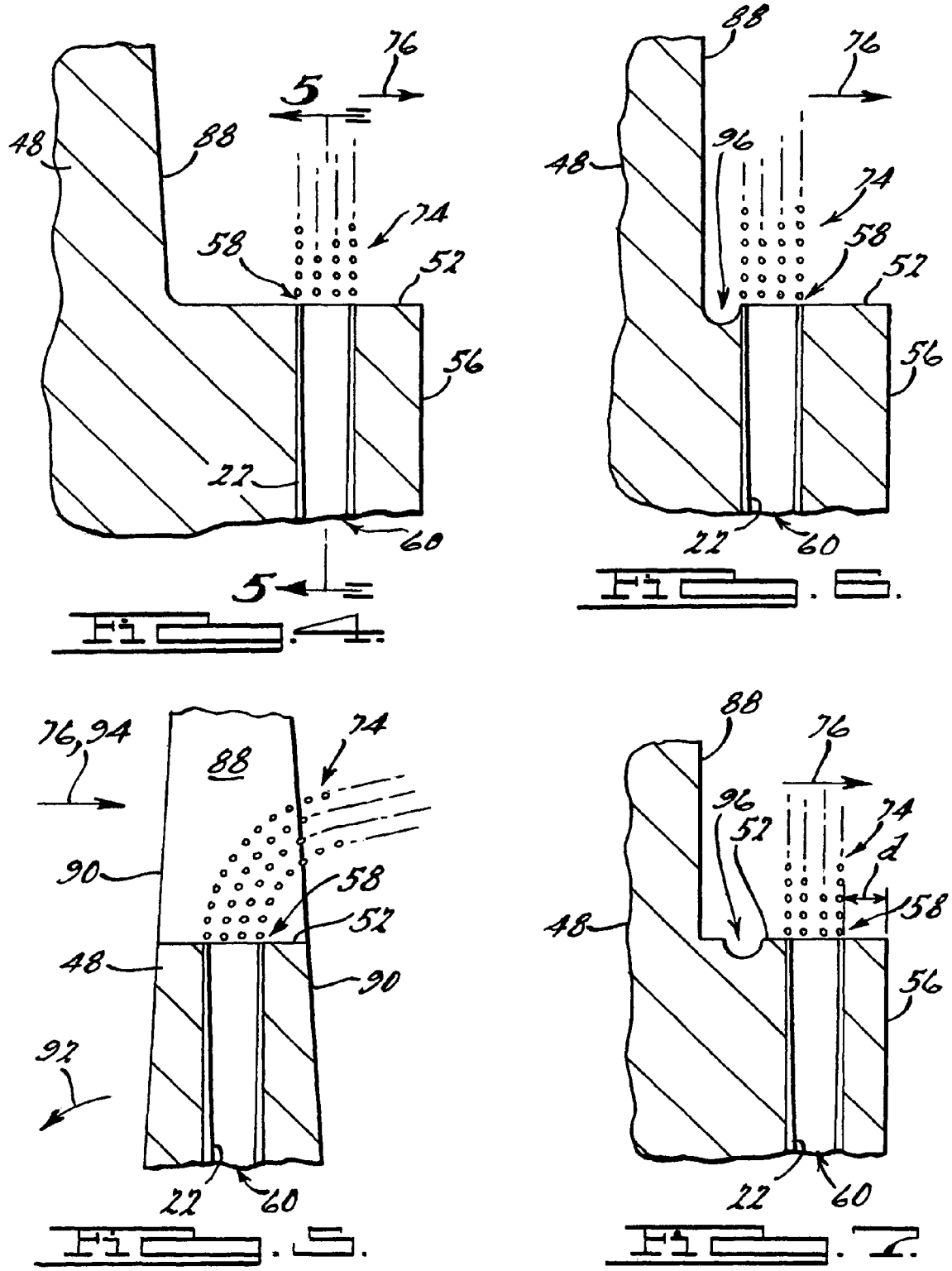

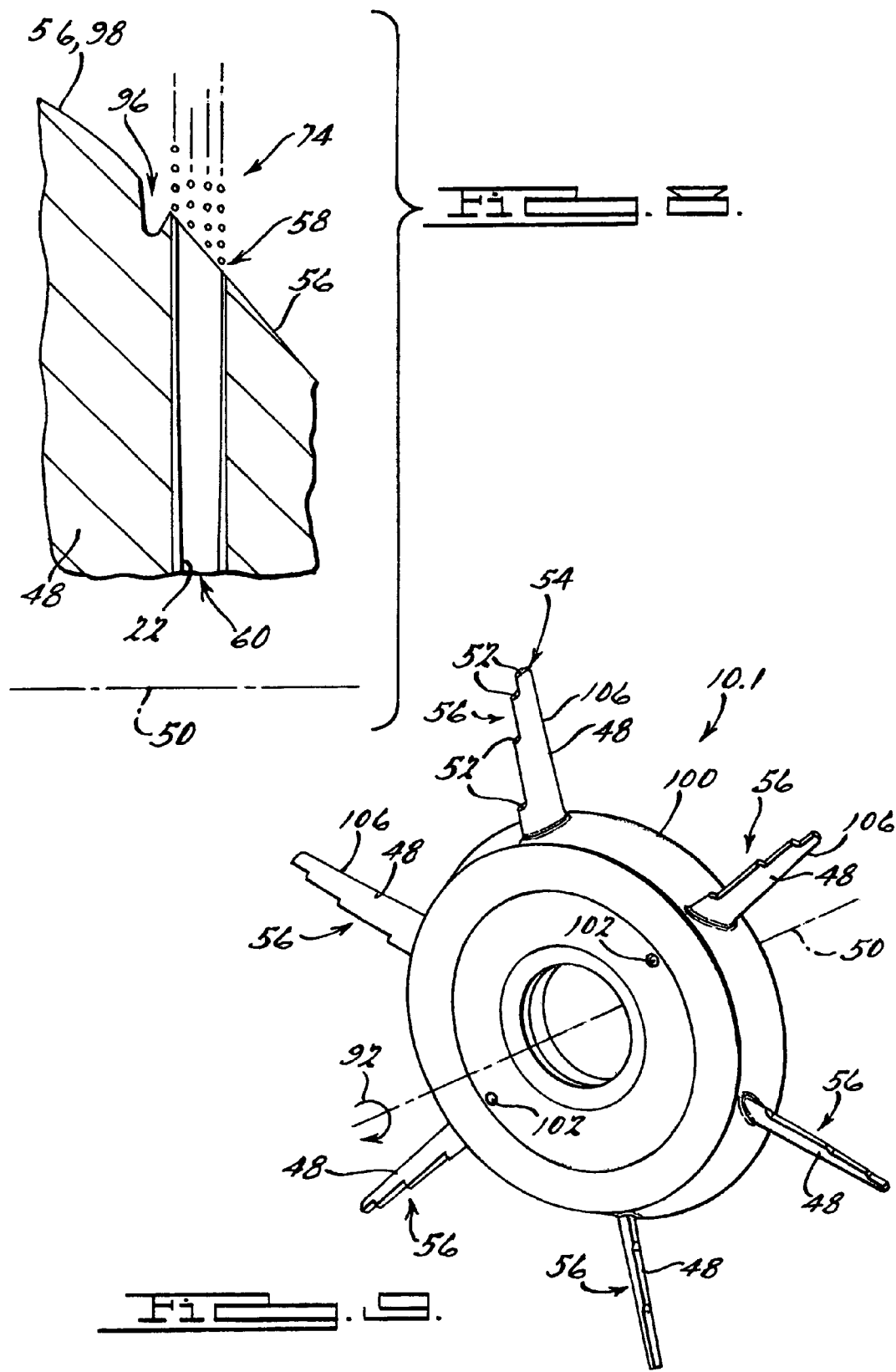

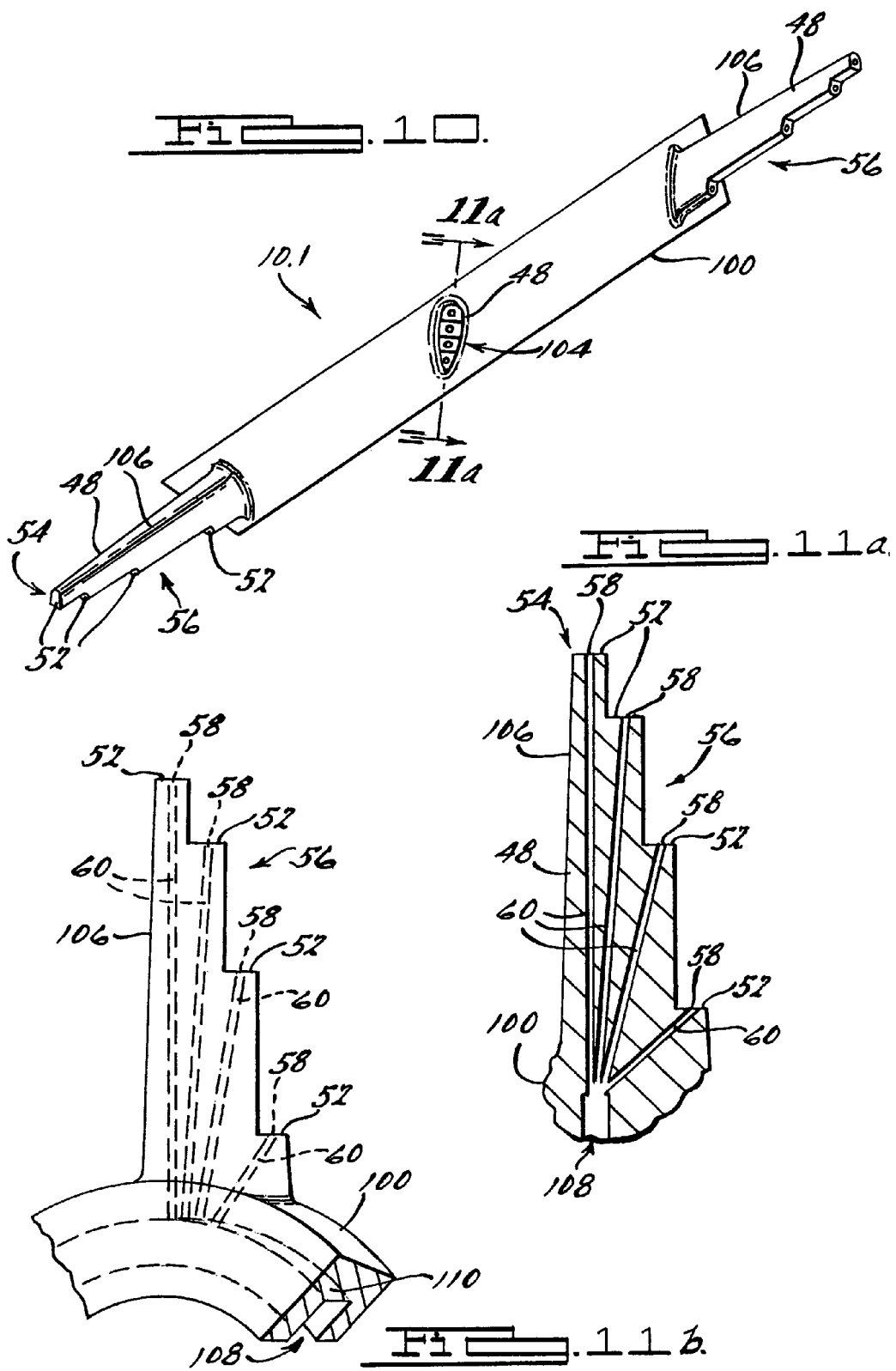

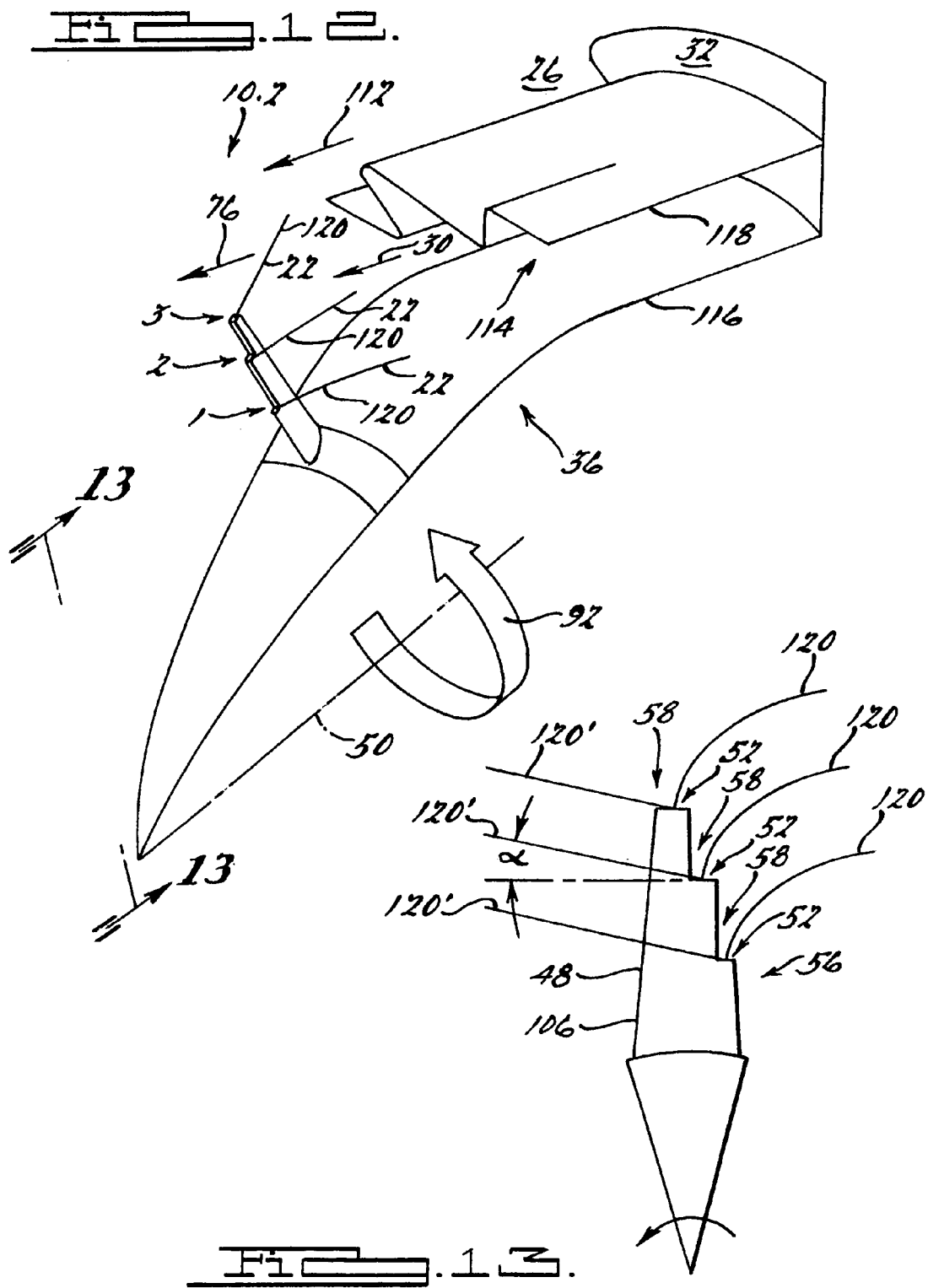

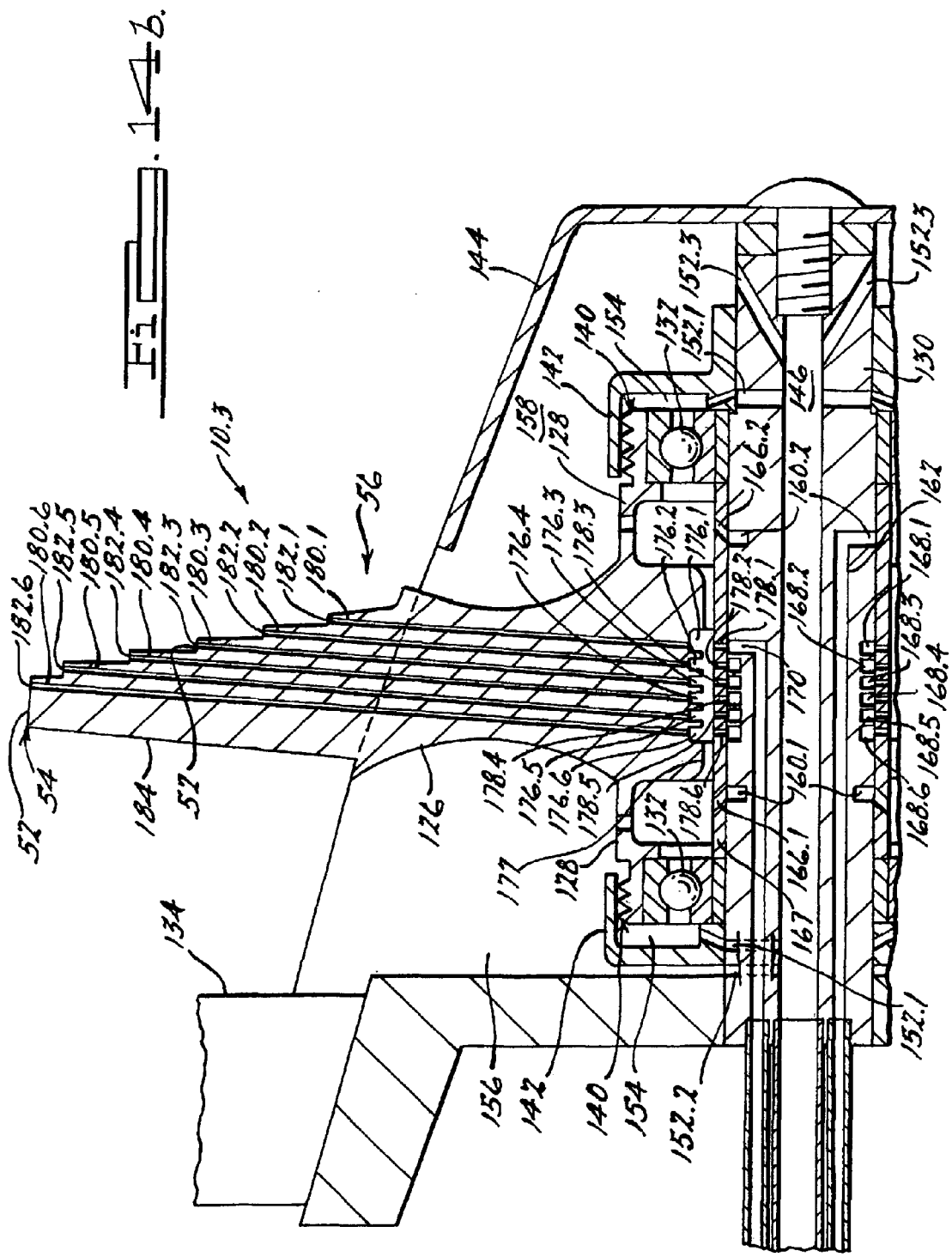

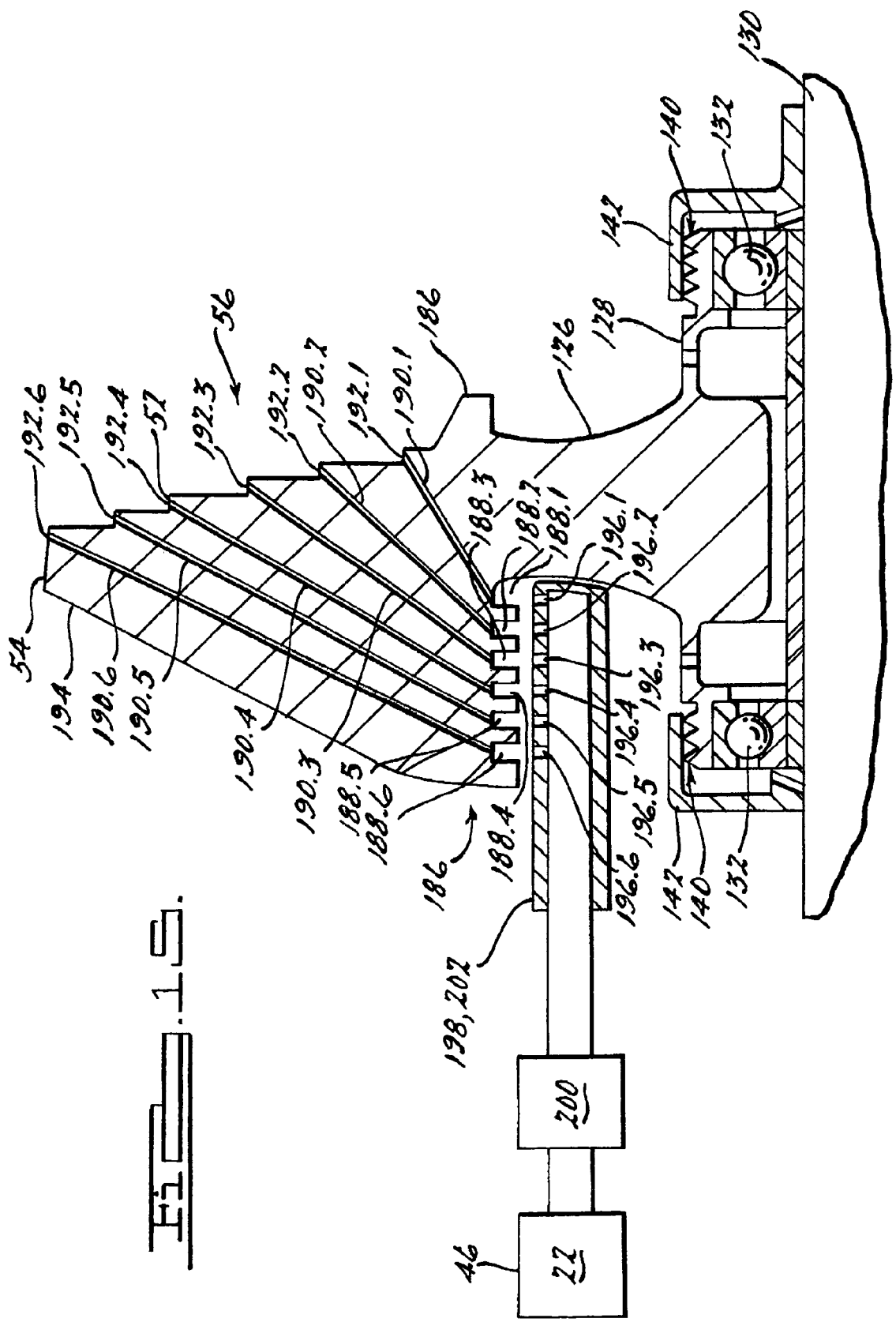

ROTARY INJECTOR

FEDERAL RESEARCH STATEMENT

The U.S. Government has a paid-up license in this invention and the right in limited circumstances to require the patent owner to license others on reasonable terms as provided for by the terms of Contract No. N00421-99-C-1390 awarded by the United States Navy.

BRIEF DESCRIPTION OF DRAWINGS

In the accompanying drawings:

FIG. 1 illustrates a fragmentary cross-sectional view of a turbine engine incorporating a turbine-driven rotary injector in an afterburner of the turbine engine;

FIG. 4 illustrates a first fragmentary cross-sectional view of an operating rotary injector incorporating a first embodiment of an injector port and an associated land;

FIG. 5 illustrates a second fragmentary cross-sectional view of an operating rotary injector incorporating a first embodiment of an injector port and an associated land;

FIG. 6 illustrates a fragmentary cross-sectional view of an operating rotary injector incorporating a second embodiment of an injector port and an associated land;

FIG. 7 illustrates a fragmentary cross-sectional view of an operating rotary injector incorporating a third embodiment of an injector port and an associated land;

FIG. 8 illustrates a fragmentary cross-sectional view of an operating rotary injector incorporating an embodiment of an injector port and an associated groove on a trailing edge of an arm;

FIG. 9 illustrates an isometric view of a rotary injector;

FIG. 10 illustrates an edge view of the rotary injector illustrated in FIG. 9;

FIG. 11a illustrates a cross-sectional view of an arm of the rotary injector illustrated in FIG. 10, illustrating a first embodiment of a fuel distribution system;

FIG. 11b illustrates a second embodiment of a fuel distribution system in an arm of the rotary injector illustrated in FIG. 10, FIG. 12 illustrates a fragmentary isometric view of a portion of a turbine engine incorporating a rotary injector;

FIG. 13 illustrates a fragmentary end-view of the portion of the turbine engine illustrated in FIG. 12;

FIGS. 14a and 14b illustrate cross-sectional views of a portion of a turbine engine incorporating a free-wheeling rotary injector in an afterburner of the turbine engine; and FIG. 15 illustrates a cross-sectional view of an alternate embodiment of a rotary injector.

DETAILED DESCRIPTION

Figure 2A:
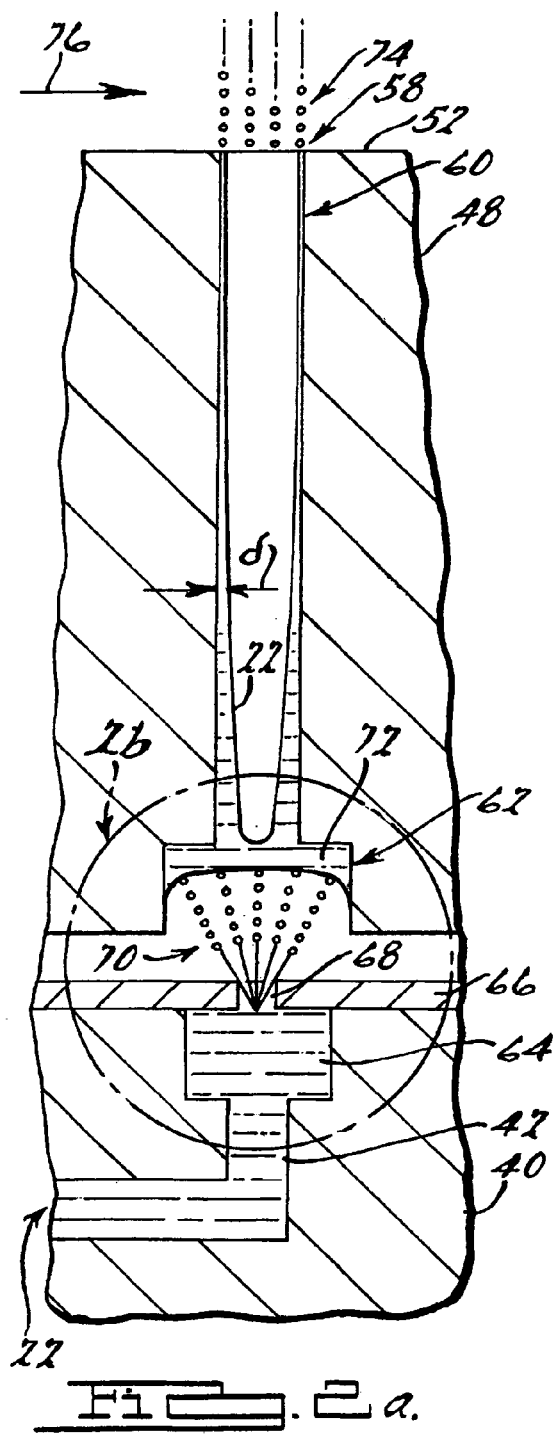
FIG. 2a illustrates a fragmentary cross-sectional view of an operating rotary injector, wherein the flow therein is choked.

Referring to FIG. 1, in accordance with an embodiment of the instant invention, a rotary injector 10 is illustrated in the environment of a turbine engine 12. The turbine engine 12 comprises a compressor 14 operatively connected to a hollow shaft assembly 16 that is driven by an associated turbine 18. A fuel slinger 20 operatively connected to the hollow shaft assembly 16 injects a first portion of liquid fuel 22.1 into a combustion chamber 24 located between the compressor 14 and the turbine 18. For example, the fuel slinger 20 may be constructed in accordance teachings of U.S. Pat. No. 4,870,825, which is incorporated herein by reference. The compressor 14 pumps a first portion of air 26.1 into the combustion chamber 24, which mixes therein with liquid fuel 22 sprayed by the fuel slinger 20 so as to form a combustible mixture that is initially ignited with an igniter 28 and then combusted in the combustion chamber 24, thereby generating exhaust gases 30 that flow through and drive the turbine 18. The compressor 14 pumps a second portion of air 26.2 through a surrounding annulus 32 that bypasses the combustion chamber 24. The second portion of air 26.2 then mixes both with the exhaust gases 30 and with a second portion of liquid fuel 22.2 injected by the rotary injector 10, whereinafter the resulting mixture may be diffused—e.g. in a diffuser 34 portion of the turbine engine 12—before being combusted in an afterburner 36 of the turbine engine 12.

The hollow shaft assembly 16 is rotationally coupled by bearings 38 to a central shaft 40 that incorporates respective fluid passages 42 that are adapted to provide liquid fuel 22 to the fuel slinger 20 and the rotary injector 10 respectively, as is more fully described hereinbelow. Each fluid passage 42 is operatively coupled to an associated control valve 44 that controls the flow of liquid fuel 22 from a source 46 thereof, which may incorporate an associated pump as necessary to provide an adequate supply of liquid fuel 22 at a sufficient pressure.

The rotary injector 10 comprises at least one radially-extending arm 48 this is adapted to rotate about an axis of rotation 50, e.g. the central axis of the central shaft 40 and hollow shaft assembly 16. In the embodiment illustrated in FIG. 1, the rotary injector 10 is adapted to rotate within the stream of exhaust gases 30 exiting the turbine 18, which is mixed with the second portion of air 26.2 from the bypass annulus 32. A plurality of lands 52 are located both on the tip 54, and stepped into the trailing edge 56, of the arm 48. Each land 52 incorporates at least one injector port 58 intersecting therewith that is operatively coupled by an associated fluid passage 60 to a cylindrical groove 62 on the inside of the hollow shaft assembly 16. Different injector ports 58 located on respective different lands 52 are located at different radial distances from the axis of rotation 50, so as to distribute the second portion of liquid fuel 22.2 injected therefrom within the stream of exhaust gases 30 mixed with the second portion of air 26.2, thereby providing for improved mixing and combustion thereof in the afterburner 36.

Figure 2B:
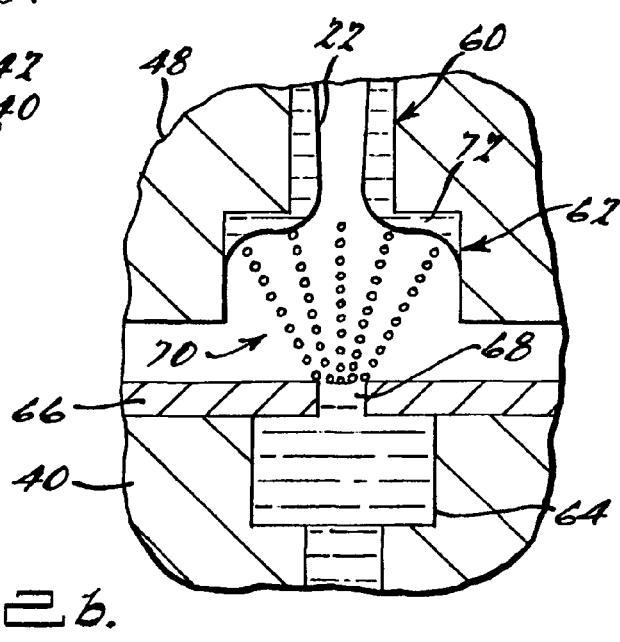
FIG. 2b illustrates a fragmentary cross-sectional view of an operating rotary injector, wherein the flow therein is un-choked.

Referring to FIG. 2a, the fluid passages 42 in the central shaft 40 are each operatively coupled to an associated cylindrical groove 64 thereon. The cylindrical grooves 64 on the central shaft 40 are aligned with corresponding cylindrical grooves 62 on the inside of the hollow shaft assembly 16, and a sleeve 66 fixed to the outside of the central shaft 40 within the hollow shaft assembly 16 is disposed therebetween. The sleeve 66 incorporates a plurality of orifices 68 that are aligned with the associated cylindrical grooves 64 on the central shaft 40. Accordingly, liquid fuel 22 admitted to a fluid passage 42 from the source 46 by a corresponding control valve 44 flows to the corresponding cylindrical groove 64 on the central shaft 40, and the flow thereof is choked by the associated orifice 68 in the sleeve 66, thereby causing the liquid fuel 22 under pressure in the cylindrical groove 64 to be sprayed from the associated orifice 68 into the corresponding cylindrical groove 62 on the inside of the hollow shaft assembly 16. The sprayed liquid fuel 70 is collected by and within the rotating cylindrical groove 62, and the centrifugal forces generated by the resulting rotation of the collected liquid fuel 72 in the rotating hollow shaft assembly 16 causes a pressurization of the collected liquid fuel 72 in the cylindrical groove 62. For sufficient collected liquid fuel 72, the flow thereof into the associated fluid passage 60 may become choked thereat, as illustrated in FIG. 2*a*. Otherwise, the collected liquid fuel 72 drains un-choked through the fluid passage 60, as illustrated in FIG. 2*b*.

The liquid fuel 22 within the associated rotating fluid passage 60 is subjected to a centrifugal acceleration field, the magnitude of which increases with the square of the radial distance from the axis of rotation 50. This acceleration field causes the liquid fuel 22 to flow within the fluid passage 60 along an associated boundary layer, a thickness î'of which is inversely related to the magnitude of the associated acceleration field thereat. Stated in another way, liquid fuel 22 nearer to the center of the fluid passage 60 is subject to less drag and would be exhausted more quickly from the fluid passage 60 than would be fluid located further from the center of the fluid passage 60, and therefore closer to the boundary thereof. When the rotary injector 10 is rotated at a relatively high rotational speed typical of normal operating conditions, the liquid fuel 22 exits the fluid passage 60 at the injector port 58 on the land 52 as a relatively thin film, which is sprayed from the injector port 58 responsive to the relatively high centrifugal acceleration force thereat. Upon exit from the injector port 58, the sprayed liquid fuel 74 interacts with a cross-flow stream 76 comprising a mixture of the stream of exhaust gases 30 with the second portion of air 26.2, and the sprayed liquid fuel 74 is atomized thereby as a result of the effects of the associated relatively high aerodynamic shear forces and the surface tension of the sprayed liquid fuel 74. This arrangement provides for unchoked flow at the end of the fluid passage 60 and through the injector port 58, which provides for improved atomization, and which is also beneficial because the fluid passage 60 and injector port 58 are self-cleaning, i.e. the liquid fuel 22 therein is purged quickly upon shutoff of the turbine engine 12, and in the case of hydrocarbon fuels would thereby help to prevent coking of the liquid fuel 22 in the fluid passage 60 or injector port 58.

Figure 3:
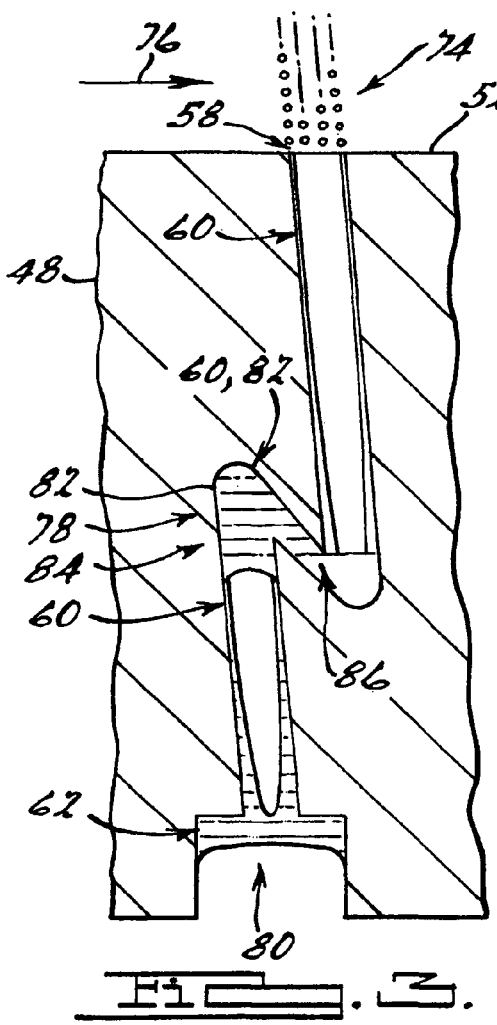
FIG. 3 illustrates a fragmentary cross-sectional view of an operating rotary injector incorporating a rotary fluid trap.

Referring to FIG. 3, a rotary fluid trap 78 located within the fluid passage 60 provides for isolating the pressure at the injector port 58 from the pressure at the entrance 80 of the fluid passage 60. In some applications, particularly when the pressure in the environment of the rotary injector 10 is relatively high, it is beneficial to isolate the pressure at the injector port 58 from the pressure at the entrance 80 of the fluid passage 60, for example, to enable the rotary injector 10 to be supplied by a relatively low pressure source 46, e.g. thereby enabling a lower pressure pump to be used therein.

In accordance with the teachings of U.S. Pat. No. 4,870, 825, incorporated herein by reference, a rotary fluid trap 78 comprises a fluid passage 82 with an inlet 84 and an outlet 86 in fluid communication there through along a length thereof, wherein the fluid passage 82 adapted so that when the rotary fluid trap 78 is rotated, a centrifugal acceleration at any point within the fluid passage 82 is greater than a centrifugal acceleration at any point on either the inlet 84 or the outlet 86. Accordingly, when the rotating fluid passage 82 is filled with a relatively high density medium, such as liquid fuel 22, the radial levels of the inlet 84 and outlet 86 will be equal when there is no pressure differential therebetween, and will be otherwise unequal by an amount dependent upon the of the pressure differential and the speed of rotation. Accordingly, for a relatively low pressure supply of liquid fuel 22 to an inlet 84 of a rotary fluid trap 78 feeding a relatively high pressure region at the outlet 86, the rotary fluid trap 78 can prevent backflow therethrough.

Referring to FIGS. 4 and 5, in a first embodiment of an injector port 58 and an associated land 52, the land 52 and an adjacent riser surface 88 are stepped into the trailing edge 56 of an arm 48 of a rotary injector 10. The injector port 58 is located on the land 52 a sufficient distance from the riser surface 88 so that the sprayed liquid fuel 74 from the injector port 58 does not attach to the riser surface 88 prior the interaction thereof with the cross-flow stream 76, thereby enabling or enhancing atomization of the sprayed liquid fuel 74. To the extent that the cross-flow stream 76 flows parallel to the sides 90 of the arm 48, the sprayed liquid fuel 74 may be at least partially shadowed therefrom for a limited period of time by the portion of the arm 48 upstream of the riser surface 88, however the rotation 92 of the arm 48 within the cross-flow stream 76, and turbulent wakes thereof behind the riser surface 88, also cause a circumferential component 94 of flow of the cross-flow stream 76 relative to the land 52. The sprayed liquid fuel 74 becomes fully exposed to cross-flow stream 76 as the riser surface 88 rotates past the location at which the sprayed liquid fuel 74 was initially injected.

Referring to FIG. 6, in a second embodiment of an injector port 58 and an associated land 52, the land 52 and an adjacent riser surface 88 are stepped into the trailing edge 56 of an arm 48 of a rotary injector 10, and the land further comprises a groove 96 located between the injector port 58 and the riser surface 88. More particularly, the groove 96 extends between the riser surface 88 and the injector port 58. With the arm 48 rotating, liquid fuel 22 exiting from the injector port 58 would require an increase in potential energy in order to migrate into the groove 96, and accordingly is precluded from doing so by this potential energy barrier. Accordingly, the groove 96 located between the injector port 58 and the riser surface 88 prevents liquid fuel 22 from migrating to the riser surface 88 upon exit from the injector port 58, and thereby enables or enhances the atomization of the liquid fuel 22 exiting the injector port 58.

Referring to FIG. 7, a third embodiment of an injector port 58 and an associated land 52 is a generalized form of the second embodiment illustrated in FIG. 6, wherein the groove 96 is located on the land 52 between the injector port 58 and the riser surface 88, but not necessarily immediately adjacent to either. Generally, the minimum distance d between the injector port 58 and the trailing edge 56 of the arm 48 is limited by machining tolerances and by the amount of thermal mass necessary in the trailing edge 56 in order to prevent burn-out thereof during operation of the turbine engine 12.

Referring to FIG. 8, in another embodiment, the injector port 58 extends through the trailing edge 56 of an arm 48 for which the profile thereof thereat is oblique relative to the axis of rotation 50. A groove 96 is located on the trailing edge 56 between the injector port 58 and a portion 98 of the trailing edge 56 in a radially increasing direction—relative to the axis of rotation 50—from the injector port 58.

Referring to FIGS. 9, 10, 11*a* and 11*b*, an embodiment of a rotary injector 10.1 comprises a plurality of arms 48, each arm 48 incorporating three lands 52 that are stepped into the trailing edge 56 thereof, and one land 52 on the tip 54 thereof. The arms 48 are connected to a disk 100 that is adapted to rotate about an axis of rotation 50. The disk 100 is provided with ports 102 for admitting liquid fuel 22 from a source 46 thereof.

Referring to FIG. 10, the arms 48 each incorporate an aerodynamic profile 104 having a leading edge 106 and a trailing edge 56 relative to a direction of rotation 92, and are oriented on the disk 100 with an angle of attack with respect to the cross-flow stream 76. As used herein, the term aerodynamic profile is intended to mean the profile of an aerodynamically smooth surface for which the irregularities are sufficiently small to be entirely embedded in the associated laminar sublayer. Furthermore, term aerodynamic profile is intended to refer to the profile of the blade absent the discontinuities, e.g. lands 52, associated riser surfaces 58 and/or grooves 96, resulting from modifications thereto in accordance with the instant invention as necessary to accommodate the associated injector ports 58. For example, in one embodiment, the arms 48 a turbine-driven rotary injector 10.1 are adapted to be aerodynamically neutral, i.e. so that they neither take nor give work to the cross-flow stream 76. In other words, in this embodiment, the arms 48 are oriented with a negligible angle of attack with respect to the cross-flow stream 76.

Referring to FIG. 11a, each land 52 of a particular arm 48 incorporates an injector port 58 that is operatively coupled by an associated fluid passage 60 to a manifold 108, which is operatively coupled to the ports 102 and receives liquid fuel 22 therefrom. The respective fluid passages 60 are coupled to the manifold a substantially common radial distance from the axis of rotation of the disk 100 so that each can receive liquid fuel 22 from the manifold 108. In the embodiment of FIG. 11a, this is accomplished by an arrangement of fluid passages 60 that intersect the surface of the manifold 108 at a substantially common location, whereas in the embodiment of FIG. 11b, this is accomplished by an arrangement of fluid passages that intersect a surface 110 of the manifold at distinct but substantially uniform radial locations.

Referring to FIGS. 12 and 13, a rotary injector 10.2 is illustrated in an afterburner 36 of a turbine engine 12 injecting liquid fuel 22 into a cross-flow stream 76 comprising a mixture of a main flow of exhaust gases 30 with a bypass flow 112 of air 26. The exhaust gases 30 are supplied from a first annulus 114 bounded by an inner shroud 116 and a mixer 118, and the bypass flow 112 is supplied from the surrounding annulus 32. The rotary injector 10.2 comprises an arm 48 having two lands 52 that are stepped into the trailing edge 56 thereof, and one land 52 on the tip 54 thereof. For a given liquid fuel 22—or generally, a first fluid—being atomized in a given cross-flow stream 76 of exhaust gases 30 mixed with air 26—or generally, a stream of second fluid—the atomization process and the trajectory 120 of the injected liquid fuel 22 are dependent upon the rotational speed of the rotary injector 10.2, the radial distance of the point of injection from the axis of rotation 50, and the velocity of the cross-flow stream 76. FIGS. 12 and 13 illustrate the trajectory 120 of the injected liquid fuel 22 with respect to the frame-of-reference of the rotary injector 10.2, whereas FIG. 13 also illustrates the trajectory 120' in an absolute frame-of-reference, wherein the injected liquid fuel 22 continues to travel generally in the direction of rotation after injection from the rotary injector 10.2. Liquid fuel 22 injected at a greater radial distance, and therefore a larger rim speed, is generally atomized more finely and the trajectory thereof may have a greater angle $α$ with respect to a tangent to the point of injection, than when injected at a lesser radial distance.

The Sauter Mean Diameter (SMD) of the droplets in the spray injected by the rotary injector 10 is a function of the density of the fluid in the cross stream, the density of the liquid fuel 22 being injected, the geometry of the injector port 58 on the land, and a strong function of the rim speed at the land radius. The SMD is inversely related to the rim speed and therefore the mean droplet diameter decreases as either the radius increases for a given rotational speed, or the rotational speed increases for a given land radius. The rotary injector 10 can create droplets streams of very low SMD by either increasing the rotational speed thereof or by increasing the radii of the associated lands 52 at which the associated injector ports 58 are located.

It should be understood that the injection process of the rotary injector 10 does not rely upon a high pressure drop across the injector port 58. In contradistinction, a known method of spraying liquid into crossflow streams of a bypass and/or core duct utilizes a series of pressure atomizers on spray bars, which generally rely upon a relatively high pressure drop across an injection orifice. The extent of atomization—or the associated SMD of the injected droplets—of a pressure atomizer is a function of the viscosity, density and surface tension of the injected liquid, the density of the fluid in the cross stream and the pressure drop across the injection orifice, so that the SMD of the injected droplets is inversely related to pressure drop. The density of the liquid fuel is not readily modified, and pressure atomizers therefore tend to require a very high pressure drop to provide low Sauter mean droplet diameters, e.g. on the order of tens of microns. This in turn requires a relatively large fuel pump that otherwise increases the weight, cost and complexity of the associated engine.

Figure 14A:
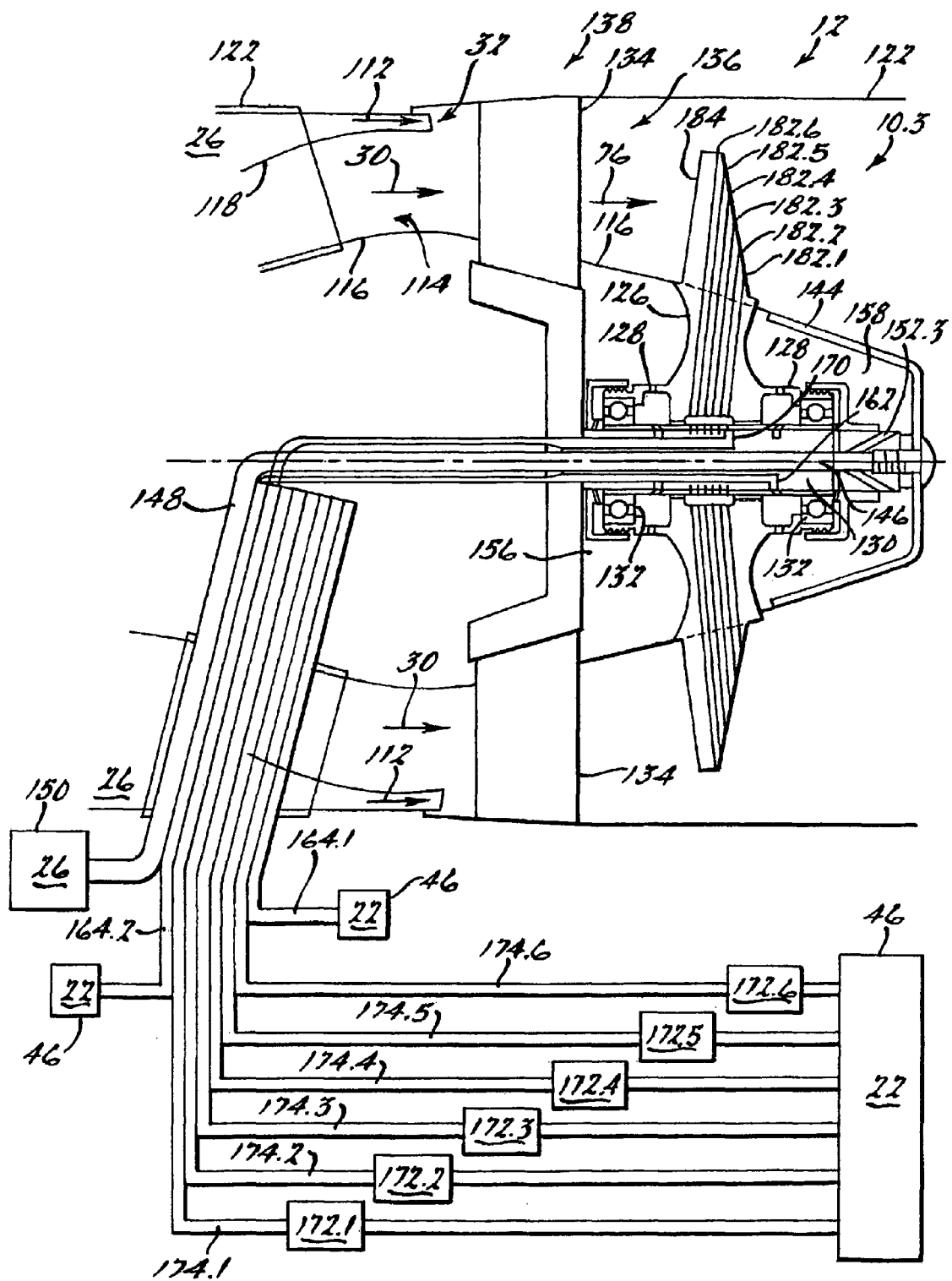

Referring to FIGS. 14a and 14b, a free-wheeling rotary injector 10.3, incorporated in the rear portion of a turbine engine 12, is adapted to inject liquid fuel 22 into a cross-flow stream 76 comprising a mixture of a main flow of exhaust gases 30 and a bypass flow 112 of air 26. The exhaust gases 30 flow through a first annulus 114 that is bounded by an inner shroud 116 and a mixer 118. The straight annular mixer 118 illustrated in FIG. 14a can be substituted with a lobed, delta tab, scalloped, or any mixer type. The bypass flow 112 flows through a surrounding annulus 32 that is bounded by an outer wall 122 of the turbine engine 12. The rotary injector 10.3 comprises a disk 126 coupled to a pair of shafts 128 from both sides thereof. The shafts 128 are rotationally coupled to a central shaft 130 with a pair of roller bearings 132, and the central shaft 130 is rearward cantilevered from struts 134 structurally coupled to the outer wall 122 of the turbine engine 12 and extending through the annulus 136 between the inner shroud 116 and the outer wall 122 in a portion of a diffuser 138 of the turbine engine 12 within which the exhaust gases 30 are mixed with the bypass flow 112 of air 26 prior to injection therein of the liquid fuel 22 by the rotary injector 10.3.

The ends of the shafts 128 incorporate labyrinth sealing surfaces 140 that cooperate with corresponding labyrinth seal housings 142. An aft wall liner 144 is operatively coupled to the central shaft 130 at one end thereof, and the central shaft 130 is provided with a central plenum 146 operatively coupled—at the other end of the central shaft 130—by an associated conduit 148 to a source of cooling air 150. A first set of fluid passages 152.1 are directed from the central plenum 146 to the space 154 between the roller bearings 132 and the labyrinth seal housings 142, in order to pressurize the space 154 so as to prevent the intrusion of exhaust gases 30 therein. A second set of fluid passages 152.2 are directed from the central plenum 146 to the space 156 external of the labyrinth seal housing 140.1 forward of the rotary injector 10.3, in order to pressurize the space 156 so as to prevent the intrusion of exhaust gases 30 therein. A third set of fluid passages 152.3 are directed from the central plenum 146 into a rear plenum 158 in order to pressurize the rear plenum 158, and may provide aft wall cooling as needed. The aft wall liner 144 may be cooled using impingement or effusion type cooling schemes.

The central shaft 130 is provided with first 160.1 and second 160.2 cylindrical grooves thereon that are operatively coupled to respective fluid passages 162 in the central shaft 130, which are in turn fed from a source 46 of liquid fuel 22 by respective conduits 164.1, 164.2. The forward and rearward roller bearings 132 are respectively cooled by spraying pressurized liquid fuel 22 in the first 160.1 and second 160.2 cylindrical grooves from respective orifices 166.1, 166.2 in a sleeve 167 surrounding the central shaft 130 between the pair of roller bearings 132.

The central shaft 130 is further provided with six sets of cylindrical grooves 168.1, 168.2, 168.3, 168.4, 168.5 and 168.6 thereon that are operatively coupled to respective fluid passages 170 in the central shaft 130, which are in turn fed from a source 46 of liquid fuel 22 through respective control valves 172.1, 172.2, 172.3, 172.4, 172.5 and 172.6 by respective conduits 174.1, 174.2, 174.3, 174.4, 174.5 and 174.6.

Similar to the operation of the embodiment illustrated in FIGS. 2a and 2b, the cylindrical grooves 168.1, 168.2, 168.3, 168.4, 168.5 and 168.6 on the central shaft 130 are aligned with corresponding cylindrical grooves 176.1, 176.2, 176.3, 176.4, 176.5 and 176.6 in the bore 177 of the disk 126. The sleeve 167—disposed between the central shaft 130 and the disk 126—incorporates a plurality of orifices 178.1, 178.2, 178.3, 178.4, 178.5 and 178.6 that are aligned with the associated cylindrical grooves 168.1, 168.2, 168.3, 168.4, 168.5 and 168.6 on the central shaft 130. Accordingly, liquid fuel 22 admitted to a fluid passage 170 from the source 46 by a corresponding control valve 172.1, 172.2, 172.3, 172.4, 172.5 or 172.6 flows to the corresponding cylindrical groove 168.1, 168.2, 168.3, 168.4, 168.5 or 168.6 on the central shaft 130, and the flow thereof is choked by the associated orifice 178.1, 178.2, 178.3, 178.4, 178.5 or 178.6 in the sleeve 167, thereby causing the liquid fuel 22 under pressure in the cylindrical groove 168.1, 168.2, 168.3, 168.4, 168.5 or 168.6 to be sprayed from the associated orifice 178.1, 178.2, 178.3, 178.4, 178.5 or 178.6 into the corresponding cylindrical groove 176.1, 176.2, 176.3, 176.4, 176.5 or 176.6 in the bore 177 of the disk 126. The sprayed liquid fuel 22 is collected by and within the rotating cylindrical groove 176.1, 176.2, 176.3, 176.4, 176.5 or 176.6, and the centrifugal forces generated by the resulting rotation of the collected liquid fuel 22 in the rotating disk 126 causes a pressurization of the collected liquid fuel 22 in the cylindrical grooves 176.1, 176.2, 176.3, 176.4, 176.5 and 176.6, which are operatively coupled via corresponding associated fluid passages 180.1, 180.2, 180.3, 180.4, 180.5 and 180.6 to corresponding associated injector ports 182.1, 182.2, 182.3, 182.4, 182.5 and 182.6 located at successively increasing radial distances on the trailing edge and tip of each radially-directed arm 184 of the rotary injector 10.3. For sufficient liquid fuel 22 collected in the respective cylindrical grooves 176.1, 176.2, 176.3, 176.4, 176.5 or 176.6, the flow thereof into the associated fluid passages 180.1, 180.2, 180.3, 180.4, 180.5 or 180.6 either becomes choked thereat, as illustrated in FIG. 2a, or is un-choked, as illustrated in FIG. 2b.

The arrangement of fluid passages 180.1, 180.2, 180.3, 180.4, 180.5 and 180.6 and injector ports 182.1, 182.2, 182.3, 182.4, 182.5 and 182.6 is illustrated schematically in FIG. 14a. Whereas the outermost injector ports 182.6 are located on respective lands 52 on the tips 54 of the respective arms 184, the remaining injector ports 182.1, 182.2, 182.3, 182.4 and 182.5 are located on the trailing edges 56 of the respective arms 184 in accordance with any of the embodiments illustrated in detail in FIGS. 4–8, i.e. the interface is adapted so as to inhibit a flow of liquid fuel 22 from an injector port 182.1, 182.2, 182.3, 182.4 or 182.5 along the respective trailing edge 56 in a radially increasing direction therefrom. Furthermore, one or more of the fluid passages 180.1, 180.2, 180.3, 180.4, 180.5 or 180.6 may incorporate a rotary fluid trap 78, e.g. as illustrated in FIG. 3, or elsewhere in the fluid path between the source 46 of liquid fuel 22 and the one or more injector ports 182.1, 182.2, 182.3, 182.4, 182.5 or 182.6.

The arms 184 are adapted with an aerodynamic profile 104 and are oriented with a sufficient angle of attack relative to the cross-flow stream 76 as necessary to spin the rotary injector 10.3 with sufficient speed—responsive to the flow of exhaust gases 30 through the arms 184 thereof—to inject and atomize liquid fuel 22 supplied thereto.

In operation, exhaust gases 30 exiting a combustor and turbine of the turbine engine 12 impinge on the arms 184 of the rotary injector 10.3, causing the rotary injector 10.3 to rotate about its axis of rotation 50. Liquid fuel 22 from the source 46 thereof is supplied through the control valves 172.1, 172.2, 172.3, 172.4, 172.5 and 172.6 and associated conduits 1741, 174.2, 174.3, 174.4, 174.5 and 174.6 and associated fluid passages 170 to the corresponding cylindrical grooves 168.1, 168.2, 168.3, 168.4, 168.5 and 168.6 on the outside of the central shaft 130. The liquid fuel 22 is sprayed therefrom into corresponding cylindrical grooves 176.1, 176.2, 176.3, 176.4, 176.5 and 176.6 in the bore 177 of the disk 126 of the rotary injector 10.3, and through the corresponding orifices 178.1, 178.2, 178.3, 178.4, 178.5 and 178.6 in the sleeve 167 around and coupled to the central shaft 130. The sprayed liquid fuel 22 is rotated with and captured by the cylindrical grooves 176.1, 176.2, 176.3, 176.4, 176.5 and 176.6 as a result of centrifugal forces therein, thereby precluding the need for otherwise sealing the cylindrical grooves 176.1, 176.2, 176.3, 176.4, 176.5 and 176.6 from one another. The liquid fuel 22 flows from the cylindrical grooves 176.1, 176.2, 176.3, 176.4, 176.5 and 176.6 into the corresponding fluid passages 180.1, 180.2, 180.3, 180.4, 180.5 and 180.6 in the rotary injector 10.3, within which the liquid fuel 22 is accelerated so as to travel principally along the walls thereof. The liquid fuel 22 is then injected into the cross-flow stream 76 from associated injector ports 182.1, 182.2, 182.3, 182.4, 182.5 and 182.6 at each of the associated radial distances associated therewith and with associated trajectories 116 and quality of atomization—e.g. the fineness and dispersal of the distribution of associated droplet sizes—that are dependent upon the radial injection point of the injector ports 182.1, 182.2, 182.3, 182.4, 182.5 and 182.6, the speed of rotation of the rotary injector 10.3, and the velocity of the cross-flow stream 76. The mixture of the liquid fuel 22 injected by the rotary injector 10.3 with the cross-flow stream 76 is combusted in the afterburner 36 of the turbine engine 12.

Referring to FIG. 15, an alternate embodiment of a rotary injector 10.4 comprises a disk 126 coupled to a pair of shafts 128 from both sides thereof, which are rotationally coupled to a central shaft 130 with a pair of roller bearings 132 similar to the embodiment illustrated in FIGS. 14a and 14b. The ends of the shafts 128 incorporate labyrinth sealing surfaces 140 that cooperate with corresponding labyrinth seal housings 142. The inside of a rim 186 of the disk 126 incorporates a plurality of cylindrical grooves 188.1, 188.2, 188.3, 188.4, 188.5 and 188.6 that are operatively coupled by associated fluid passages 190.1, 190.2, 190.3, 190.4, 190.5 and 190.6 to injector ports 192.1, 192.2, 192.3, 192.4, 192.5 and 192.6 located at successively increasing radial distances on the trailing edge 56 and tip 54 of each radially-directed arm 194 of the rotary injector 10.3. A fuel distributor 198 comprises a plurality of orifices 196.1, 196.2, 196.3, 196.4, 196.5 and 196.6 that respectively cooperate with the corresponding cylindrical grooves 188.1, 188.2, 188.3, 188.4, 188.5 and 188.6. The fuel distributor 198 is operatively coupled by at least one a control valve 200 to a source 46 of liquid fuel 22, and provides for distributing liquid fuel 22 from the orifices 196.1, 196.2, 196.3, 196.4, 196.5 and 196.6 to the corresponding cylindrical grooves 188.1, 188.2, 188.3, 188.4, 188.5 and 188.6 in the rim 186 of the disk 126, which in turn supplies the corresponding injector ports 192.1, 192.2, 192.3, 192.4, 192.5 and 192.6 through the associated fluid passages 190.1, 190.2, 190.3, 190.4, 190.5 and 190.6. The fuel distributor 198 can be embodied in a variety of ways. For example, in the embodiment illustrated in FIG. 15, the fuel distributor 198 comprises a manifold 202, e.g. comprising either at least one pipe or a cylindrical shell, e.g. relatively fixed with respect to the turbine engine 12, wherein the relative distribution of liquid fuel amongst the orifices 196.1, 196.2, 196.3, 196.4, 196.5 and 196.6 is fixed by the relative sizes and positions of the respective orifices 196.1, 196.2, 196.3, 196.4, 196.5 and 196.6. Alternatively, the orifices 196.1, 196.2, 196.3, 196.4, 196.5 and 196.6 of the fuel distributor 198 may be independently coupled through separate fluid passages to separate, respective control valves 200, so as to provide for independent control of the associated flows of liquid fuel 22 to the respective orifices 196.1, 196.2, 196.3, 196.4, 196.5 and 196.6, as is the case for the embodiment illustrated in FIGS. 14a and 14b.

The instant invention has been illustrated herein with several embodiments for injecting liquid fuel in the afterburner of a turbojet or turbofan engine. It should be understood that these embodiments and this application are for purposes of illustration, and are not considered to be limiting. For example, the instant invention could be used as either a driven or free-wheeling rotary injector to supply fuel in an interstage turbine burner. Furthermore, although the instant invention has been illustrated in the environment of a turbine engine incorporating a bypass flow, it should be understood that the instant invention can also be adapted to operate without a bypass flow. Yet further, the instant invention could be adapted to supply liquid fuel to the main combustion chamber of a turbine engine directly from the compressor blades thereof, thereby precluding the need for a separate fuel slinger in the main combustion chamber. The arms of the rotary injector may be separate components that are operatively coupled to the associated disk, or may be integrated therewith as a bladed disk, otherwise known as a blisk.

Furthermore, the instant invention is not limited to the atomization of liquid in a cross-flow stream of gas. For example, the instant invention could be incorporated in a rotary injector for injecting a first liquid into a cross-flow stream comprising a generalized fluid, e.g. a liquid, for purposes of mixing the first fluid in the generalized fluid.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A rotary injector, comprising:
   a. at least one arm adapted to rotate about an axis of rotation, wherein said at least one arm extends in a radial direction with respect to said axis of rotation, said at least one arm is adapted to rotate within a stream of first fluid adapted to flow across said at least one arm, and at least one said arm comprises a plurality of lands, wherein said plurality of lands are adapted so that said stream of first fluid can flow across said plurality of lands and at least two of said plurality of lands are located at different radial distances from said axis of rotation; and
   b. at least one port located on each of said plurality of lands, wherein said at least one port is operatively coupled by an associated fluid passage to a source of a second fluid.

2. A rotary injector as recited in claim 1, wherein said at least one arm is adapted to freely rotate about said axis of rotation.

3. A rotary injector as recited in claim 1, wherein said at least one arm is adapted to be driven about said axis of rotation.

4. A rotary injector as recited in claim 1, wherein said first fluid comprises a gaseous oxidizer, and said second fluid comprises a liquid fuel.

5. A rotary injector as recited in claim 1, wherein at least one of said plurality of lands forms a surface of a step in said at least one arm.

6. A rotary injector as recited in claim 5, wherein at least one said step is located on a trailing edge of said arm relative to a direction of rotation.

7. A rotary injector as recited in claim 1, further comprising a rotary fluid trap located between said source of said second fluid and said at least one port.

8. A rotary injector as recited in claim 1, wherein said associated fluid passage comprises a plurality of associated fluid passages operatively connecting at least two of said ports to a manifold, wherein said at least two of said ports are located on different said lands of said at least one said arm.

9. A rotary injector as recited in claim 1, wherein at least one arm comprises an aerodynamic profile having a leading edge and a trailing edge relative to a direction of rotation.

10. A method of injecting a first fluid in a second fluid, comprising:
    a. supplying the first fluid to a plurality of ports, wherein said plurality of ports are located on a corresponding plurality of lands, and at least two of said plurality of lands are located at different radial distances from an axis of rotation;
    b. causing the second fluid to flow across each of said plurality of lands;
    c. rotating said plurality of ports and said corresponding plurality of lands about said axis of rotation, thereby causing said first fluid to be injected into said second fluid from said plurality of first ports; and
    d. atomizing said first fluid responsive to an interaction of said first fluid with said second fluid external of said plurality of first ports so as to generate an atomized first fluid.

11. A method of injecting a first fluid in a second fluid as recited in claim 10, further comprising isolating a first pressure of a source of said first fluid from a second pressure of said first fluid at at least one of said plurality of ports using a fluid trap that is rotated.

12. A method of injecting a first fluid in a second fluid as recited in claim 11, wherein said fluid trap is rotated about said axis of rotation in synchronism with said plurality of ports and said corresponding plurality of lands.

13. A method of injecting a first fluid in a second fluid as recited in claim 10, wherein the operation of rotating said plurality of ports and said corresponding plurality of lands is responsive to an interaction of an arm with said second fluid.

14. A method of injecting a first fluid in a second fluid as recited in claim 10, further comprising mixing said atomized first fluid with said second fluid, and combusting a resulting mixture thereof.

15. A rotary injector, comprising:
  a. at least one arm adapted to rotate about an axis of rotation, wherein said at least one arm extends in a radial direction with respect to said axis of rotation, said at least one arm is adapted to rotate within a stream of first fluid adapted to flow across said at least one arm, at least one said arm comprises a land, and said land is stepped into a trailing edge of said at least one said arm; and
  b. at least one port located on said land, wherein said at least one port is operatively coupled by an associated fluid passage to a source of a second fluid, and said land and said at least one port are adapted to provide for injecting said second fluid in a radially increasing direction from said land.

16. A rotary injector as recited in claim 15, wherein said trailing edge of said at least one said arm comprises a riser surface adjacent to said land, said riser surface is stepped into said trailing edge, and said land comprises a groove located between said at least one port and said riser surface.

17. A rotary injector as recited in claim 15, wherein said trailing edge of said at least one said arm comprises a riser surface adjacent to said land, said riser surface is stepped into said trailing edge, and said at least one port is located on said land at a sufficient distance from said riser surface so that when said second fluid is injected from said at least one port, said second fluid is detached from said land and from said riser surface upon exiting said at least one port.

18. A rotary injector as recited in claim 15, wherein at least one arm is adapted to freely rotate about said axis of rotation.

19. A rotary injector as recited in claim 15, wherein at least one arm is adapted to be driven about said axis of rotation.

20. A rotary injector as recited in claim 15, wherein said first fluid comprises a gaseous oxidizer, and said second fluid comprises a liquid fuel.

21. A rotary injector as recited in claim 15, further comprising a rotary fluid trap located between said source of said second fluid and said at least one port.

22. A rotary injector as recited in claim 15, wherein at least one arm comprises an aerodynamic profile having a leading edge and a trailing edge relative to a direction of rotation.

23. A rotary injector, comprising:
  a. at least one arm adapted to rotate about an axis of rotation, wherein said at least one arm extends in a radial direction with respect to said axis of rotation, and said at least one arm is adapted to rotate within a stream of first fluid adapted to flow across said at least one arm; and
  b. at least one port located on said trailing edge of at least one arm, wherein said at least one arm comprises a groove located on said trailing edge between said at least one port and a portion of said trailing edge in a radially increasing direction from said at least one port, and said at least one port is operatively coupled by an associated fluid passage to a source of a second fluid.

24. A rotary injector as recited in claim 23, wherein said at least one arm is adapted to freely rotate about said axis of rotation.

25. A rotary injector as recited in claim 23, wherein said at least one arm is adapted to be driven about said axis of rotation.

26. A rotary injector as recited in claim 23, wherein said first fluid comprises a gaseous oxidizer, and said second fluid comprises a liquid fuel.

27. A rotary injector as recited in claim 23, further comprising a rotary fluid trap located between said source of said second fluid and said at least one port.

28. A rotary injector as recited in claim 23, wherein at least one arm comprises an aerodynamic profile having a leading edge and a trailing edge relative to a direction of rotation.

29. A method of injecting a first fluid in a second fluid, comprising:
  a. supplying the first fluid to a port, wherein said port is located on a trailing edge of an arm;
  b. adapting said trailing edge of said arm proximate to said port so as to inhibit a flow of said first fluid from said port along said trailing edge in a radially increasing direction from said port;
  c. causing the second fluid to flow across said port;
  d. rotating said arm about said axis of rotation, thereby causing said first fluid to be injected into said second fluid from said port; and
  e. atomizing said first fluid responsive to an interaction of said first fluid with said second fluid external of said port so as to generate an atomized first fluid.

30. A method of injecting a first fluid in a second fluid as recited in claim 29, wherein the operation of adapting said trailing edge comprises adapting said trailing edge with a land that is stepped into said trailing edge, wherein said port is located on said land.

31. A method of injecting a first fluid in a second fluid as recited in claim 29, wherein the operation of adapting said trailing edge comprises adapting said trailing edge with a groove that is located between said port and portion of said trailing edge located in a radially increasing direction from said port.

32. A method of injecting a first fluid in a second fluid as recited in claim 29, further comprising isolating a first pressure of a source of said first fluid from a second pressure of said first fluid at said port using a fluid trap that is rotated.

33. A method of injecting a first fluid in a second fluid as recited in claim 32, wherein said fluid trap is rotated about said axis of rotation in synchronism with said port.

34. A method of injecting a first fluid in a second fluid as recited in claim 29, wherein the operation of rotating said port is responsive to an interaction of said arm with said second fluid.

35. A method of injecting a first fluid in a second fluid as recited in claim 29, further comprising mixing said atomized first fluid with said second fluid, and combusting a resulting mixture thereof.

* * * * *